(12) United States Patent
Redmer (10) Patent No.: US 7,119,335 B2
(45) Date of Patent: Oct. 10, 2006

(54) METHOD AND SYSTEM FOR THE DISRUPTION OF THERMAL VISION DEVICES

(75) Inventor: Ronald D Redmer, Lake Orion, MI (US)

(73) Assignee: Technical Products Group, Inc., Lake Orion, MI (US)

(*) Notice: Subject to any disclaimer, the term of this patent is extended or adjusted under 35 U.S.C. 154(b) by 74 days.

(21) Appl. No.: 10/904,701

(22) Filed: Nov. 23, 2004

(65) Prior Publication Data

US 2006/0065835 A1    Mar. 30, 2006

Related U.S. Application Data

(60) Provisional application No. 60/522,406, filed on Sep. 27, 2004.

(51) Int. Cl.
    *G01J 5/02* (2006.01)

(52) U.S. Cl. .................................. 250/339.08

(58) Field of Classification Search ............ 250/339.08
    See application file for complete search history.

(56) References Cited

U.S. PATENT DOCUMENTS

| 5,742,384 A * | 4/1998 | Farmer ..................... 356/141.4 |
| 6,896,381 B1 * | 5/2005 | Benitez et al. .............. 359/858 |
| 2003/0039036 A1 * | 2/2003 | Kruschwitz et al. ........ 359/707 |
| 2005/0065668 A1 * | 3/2005 | Sanghera et al. ............. 701/3 |
| 2006/0000988 A1 * | 1/2006 | Stuart et al. ............ 250/504 R |

* cited by examiner

*Primary Examiner*—Albert J. Gagliardi
*Assistant Examiner*—Marcus Taningco
(74) *Attorney, Agent, or Firm*—David Bogart Dort; Rubinstein Law Group, P.C.

(57) ABSTRACT

The present invention uses laser diodes in conjunction with a holographic diffuser and lens assembly to generate and effectively disperse the radiation (infrared light) in a spectrum and pattern that is interpreted as heat by certain vision systems to effectively interfere with the electronic processing capability of the vision systems.

26 Claims, 8 Drawing Sheets

METHOD AND SYSTEM FOR THE DISRUPTION OF THERMAL VISION DEVICES

CROSS REFERENCE TO RELATED APPLICATIONS

This Application claims priority under 35 USC §119(e) to U.S. Provisional Application 60/522,406, filed Sep. 7, 2004, which is fully incorporated by reference for all purposes.

STATEMENT REGARDING FEDERALLY SPONSORED RESEARCH OR DEVELOPMENT

Not applicable.

BACKGROUND

A thermal vision system (not shown) generally consists of a camera that senses heat from the environment and processes the signals electronically. The electronic signals are then transformed into a virtual image that is projected onto a display for viewing. These systems are designed to detect differential temperature to generate image resolution and therefore are limited in their ability to instantaneously process and respond to large increases or decreases in ambient light whether or not it is in the visible spectrum.

U.S. Pat. Nos. 5,700,078, 5,771,326, 5,791,757, 5,796,904, 5,857,770, 5,890,796, 5,971,578, 6,036,340, 6,422,713, and 6,429,429, which are all currently owned by Ford Global Technologies of Dearborn, Mich., teach laser illumination systems which are generally for automotive use. These patents are incorporated by reference for all purposes.

SUMMARY

The present invention relates generally to methods and systems for jamming thermal and other types of vision systems using laser diode technology in conjunction with a diffuser and lens assembly. The present invention generates and effectively disperses the light in a spectrum that is interpreted as heat by thermal vision systems, which causes more extensive electronic processing and an instantaneous jamming response.

In a first aspect of the invention, a method for interference with the electronic processing capability of vision systems is provided that includes generating radiation from at least one diode, collecting the radiation from the diode in at least one lens, directing the radiation to a diffusion system that is adapted to perform a non-linear operation on said radiation, diffusing the radiation into viewing target areas to create at least one radiation field that covers the viewing target for the vision system, thereby interfering with the electronic capability of vision systems.

In a second aspect of the invention, a method for interference with the electronic processing capabilities of a vision system is provided that includes generating radiation from the first multiple laser diode, collecting the radiation from a first multiple laser diode in a lens, directing the radiation to a diffusion system that is adapted to perform a non-linear operation on radiation, performing a non-linear operation on the radiation to create a diffused radiation field that covers a viewing target for the vision system, diffusing the radiation into at least on viewing target area to create a radiation field that covers the viewing target for the vision system and generating radiation from a second multiple laser diode, wherein the first and second multiple laser diodes generate radiation with different properties.

In a third aspect of the invention, a method for interference with the electronic processing capabilities of a vision system is provided that includes generating radiation from at least one laser diode, collecting the radiation from the at least one laser diode, directing the radiation to a diffusion system that is capable of performing a non-linear operation on the radiation and diffusing the radiation into at least one viewing target area to create at least one radiation field that covers a viewing target for the vision system, wherein the diffusion system comprises at least one layer of holographic diffusion film.

In a fourth aspect of the invention, a method for interfering with the electronic processing capabilities of a vision system is provided that includes creating a first infrared light pulse of a first time period, diffusing the first infrared pulse through a first Fourier transform at a target to block viewing of the target with the thermal vision system, creating a second infrared light pulse of a second time period, the second time period being a time period that is longer than the first time period, diffusing the second infrared light pulse through a Fourier transform at the target to block viewing of the target with the thermal vision system, generating a third infrared pulse of a third time period, the third time period being a time period that is longer than the first time period and longer than the second time period, and diffusing the third infrared pulse through a Fourier transform to interfere with the electronic processing capabilities of a vision system.

In a fifth aspect of the invention, a vision jamming system is provided that includes a diffusion system, at least one laser diode in operational communication with the diffusion system, the at least one laser diode being adapted to generate radiation in a spectrum between 700 and 1000 nanometers and at least one lens adapted to collect the generated radiation and direct it to the diffusion system, which is in operable communication therewith.

In a sixth aspect of the invention, a vision jamming system is provided that includes a polycarbonate holographic diffusion system, at least one pulsed laser diode in operational communication with the diffusion system, the at least one laser diode being adapted to generate radiation in a spectrum between 700 and 1000 nanometers and at least one lens adapted to collect the generated radiation and direct it to the diffusion system, which is in operable communication therewith.

DESCRIPTION

Figure 1A:
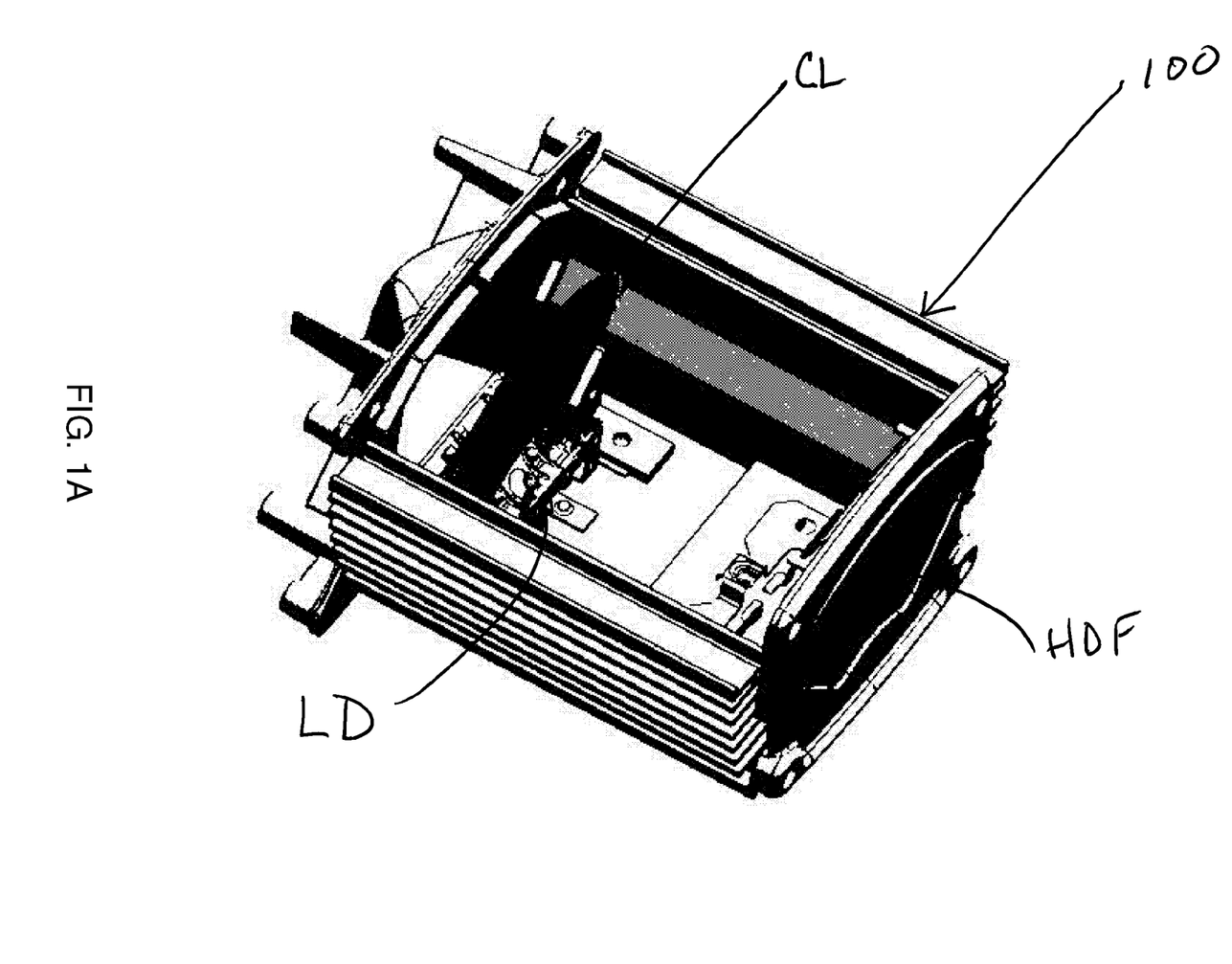
FIG. 1A is a sample laser-diode interference device in a first embodiment from a top cutaway view.

FIG. 1A shows a first embodiment of the vision jamming system 100 of the invention. The system 100 comprises at least one laser diode, a holographic diffuser and a lens assembly, which are all in operable communication with each other. As used herein, "operable communication" means a proximity sufficient to allow the components of the invention to effectively operate within system 100. The components of system 100 need not be in direct physical contact with each other to interfere with the electronic processing of vision systems. During use, the system 100 effectively generates and disperses light in a spectrum that is interpreted as heat by thermal vision systems by pulsing a laser diode LD through a holographic diffuser HDF and specialized lens CL to generate an intermittent curtain of high-intensity non-visible light. The light that effectively overloads the electronic processing capability of various vision systems, including but not limited to thermal visions systems.

Figure 1B:
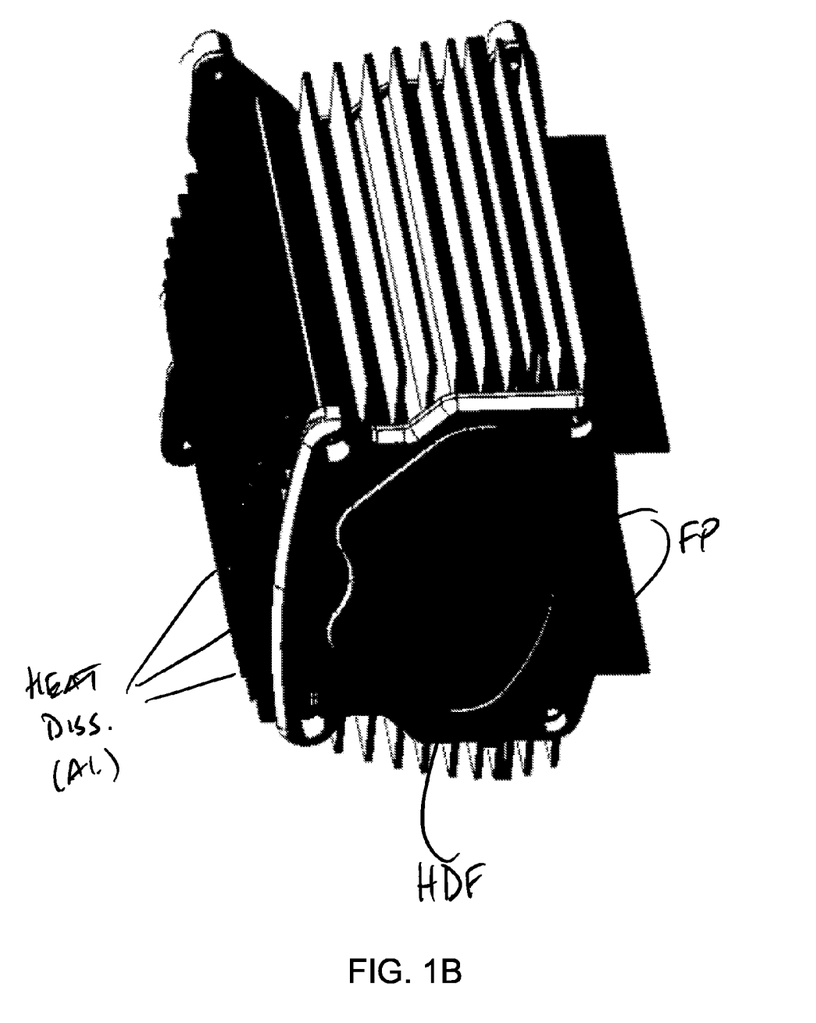
FIG. 1B is another view of the first embodiment from a front/side view.
Figure 3A:
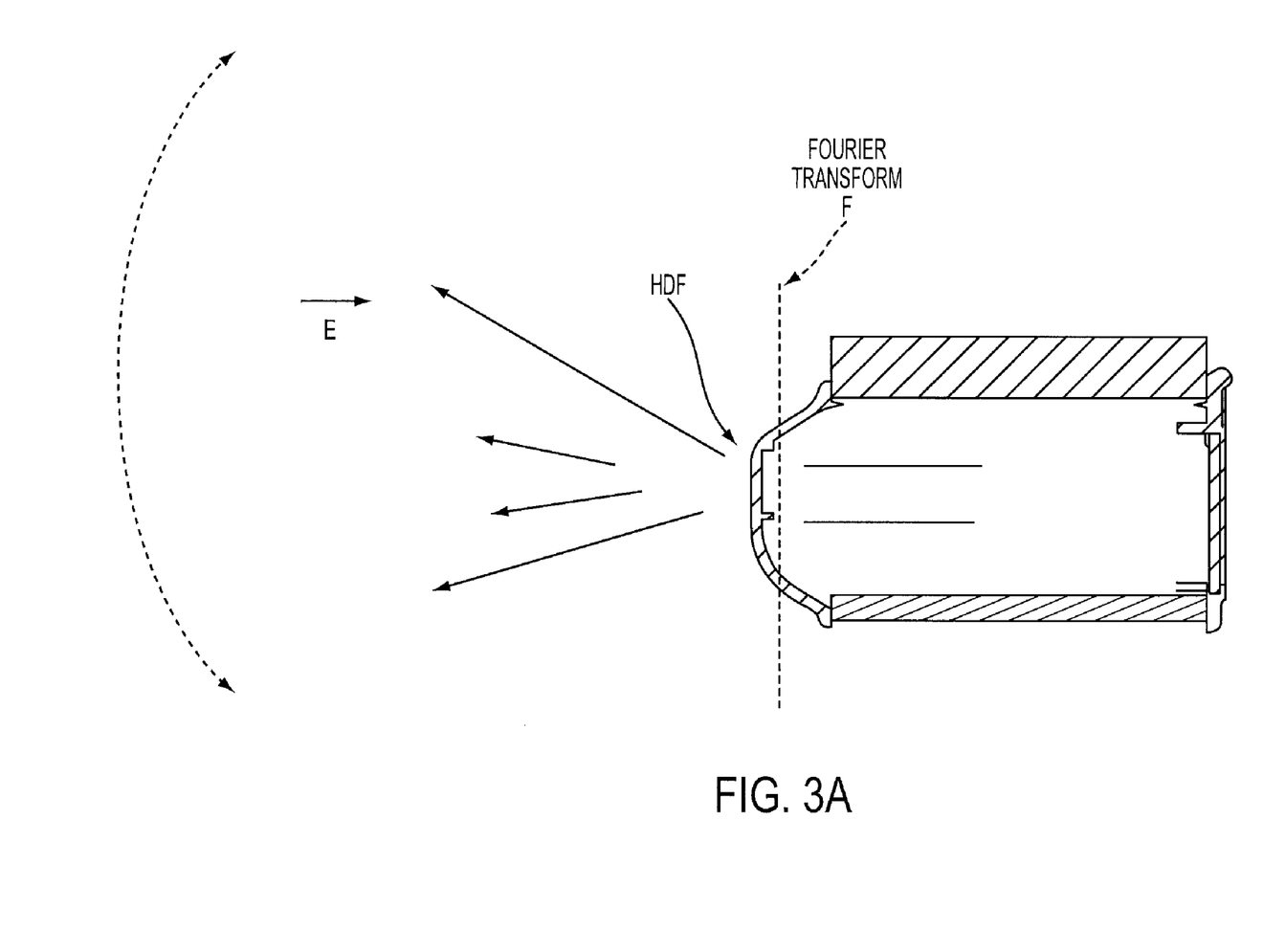
FIG. 3A shows the use of the invention to create thermal vision interference.
Figure 3B:
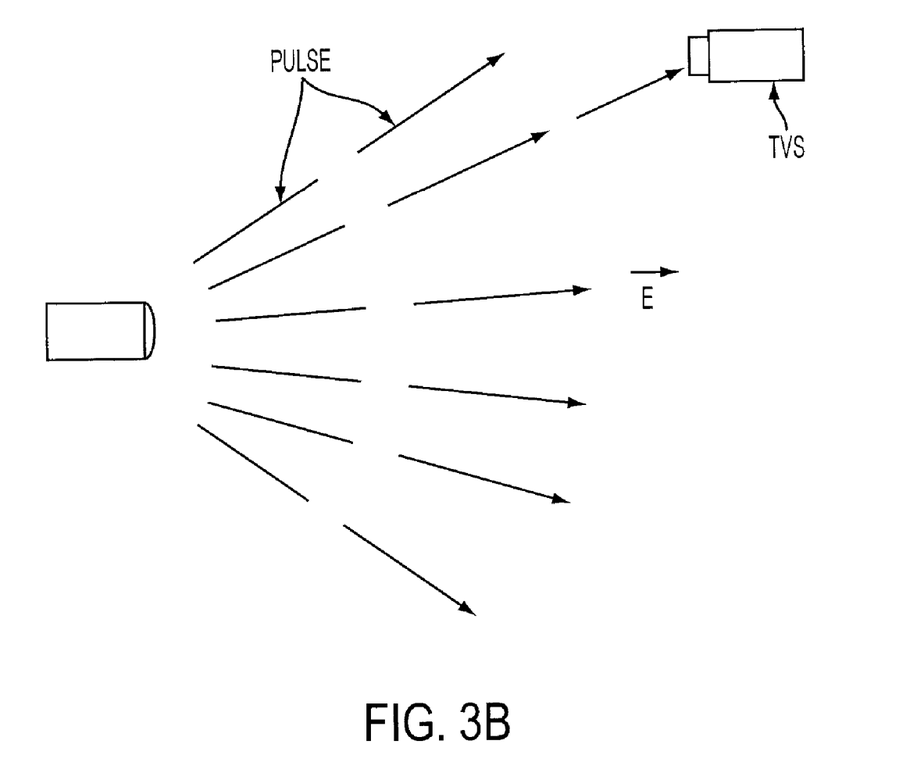
FIG. 3B illustrates a sample interference (infrared light as particles or rays for illustrative purposes) pattern.

As shown in FIG. 3B, the present jamming system 100 generates light in a spectrum that is between 700 nm and 1000 nm (infrared). Light within this spectrum is interpreted as heat by thermal vision systems, which causes more extensive electronic processing and a fast jamming response. The system 100 can electronically control the pulse characteristics in an encoded and encrypted manner to prevent next-generation thermal vision systems TVS from countering the technology unless operated with controlled decryption technology. As used herein, the terms "light" and "radiation" are used interchangeable. FIG. 1B shows the first embodiment from a front view.

Generally system 100 effectively interferes with the electronic processing capability of vision systems by generating radiation from at least one diode, collecting the radiation from the diode in at least one lens, directing the radiation to a diffusion system that is adapted to perform a non-linear operation the radiation and diffusing the radiation into target viewing areas to create at least one radiation filed that covers the viewing target for the vision systems.

Figure 2A:
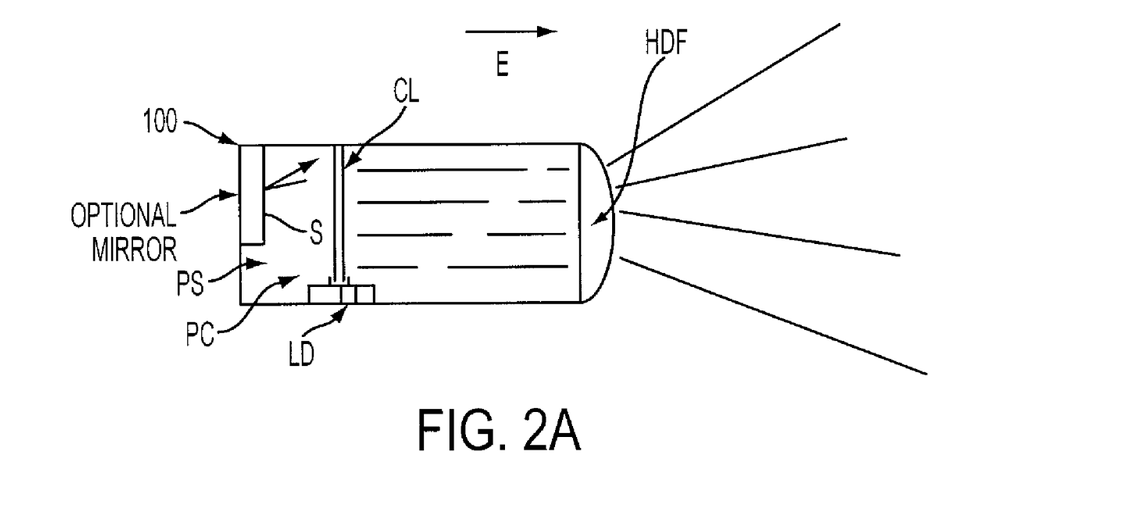
FIG. 2A illustrates the functional operation of a first embodiment of the thermal vision interference system.
Figure 2B:
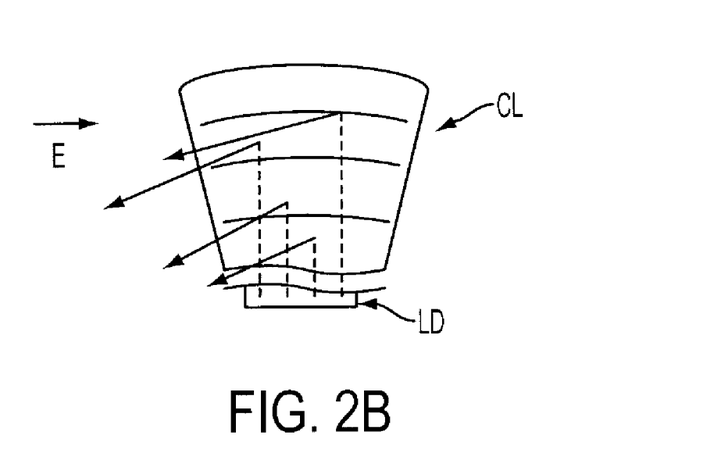
FIG. 2B illustrates the functional operation from a front view.

FIGS. 2A and 2B illustrate the functional relationship of the components of system 100 in one specific embodiment. The laser diode LD generates radiation, generally between 700 nanometers ("nm") and 1000 nm, either in a convergent or divergent pattern. The "light" enters a lens CL, which collects the incident light and propagates it directly, or via an optional mirror, to a diffusion system, which in one embodiment is a polycarbonate holographic diffusion film HDF. The polycarbonate holographic diffusion film is commercially available from Physical Optics Corporation of California. The HDF is generally molded into the front piece (not shown) of the interference system 100, but need not be. The light energy or radiation is then diffused into the target areas based on the holographic pattern to create interference with the vision system (not shown). In specific embodiments of the invention, a pulse control PS is integrated directly into the laser diode LD, or alternately is contained on an ASIC or integrated with a power source PS. FIG. 2B illustrates a front view of FIG. 2A.

In another specific embodiment of the invention, the vision jamming system 100 comprises a polycarbonate holographic diffusion system, at least one pulsed laser diode in operable communication with the diffusion system, the laser diode being adapted to generate radiation in a spectrum between 700 and 1000 nm, and at least one lens that is adapted to collect the generated radiation and direct it to the diffusion system, which is in operable communication therewith.

FIG. 3A illustrates one embodiment of the invention where the holographic diffusion film HDF acts as a Fourier transform F on the emitted radiation to create the interfering radiation field E. As can be appreciated by those of skill in the art, there may be different types of Fourier transforms that would be appropriate for use in the system 100 of the invention, depending on the intended end use. For example, a user may wish to create thermal vision system ("TVS") interference in a narrow swath instead of wide dispersement. Using multiple types Fourier transforms is discussed below.

As shown in FIG. 3B, the present thermal vision jamming system 100 generates light in a spectrum that is between 700 nm and 1000 nm (infrared). Light within this spectrum is interpreted as heat by thermal vision systems, which causes more extensive electronic processing and a fast jamming response. The system 100 can electronically control the pulse characteristics in an encoded and encrypted manner to prevent next-generation thermal vision systems TVS from countering the technology unless operated with controlled decryption technology.

Figure 4A:
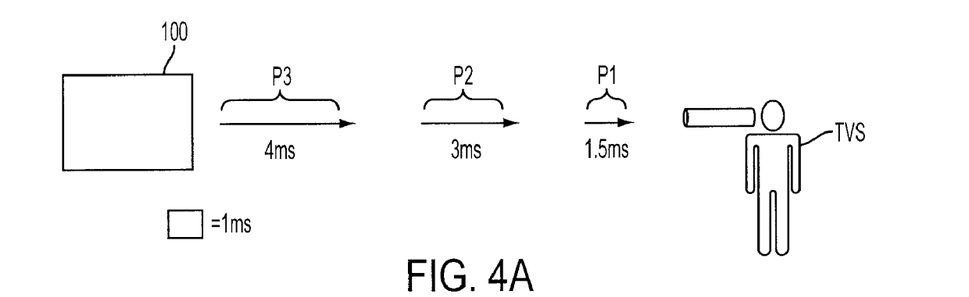
FIG. 4A illustrates using a variable pulse.
Figure 4B:
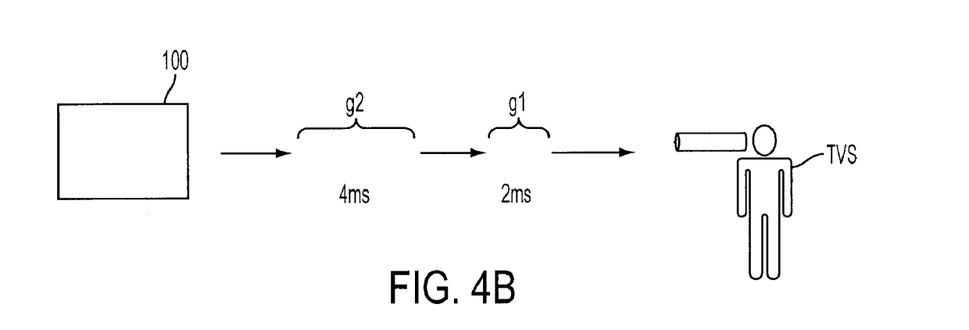
FIG. 4B illustrates using a variable gap or frequency (independent of pulse length)
Figure 4C:
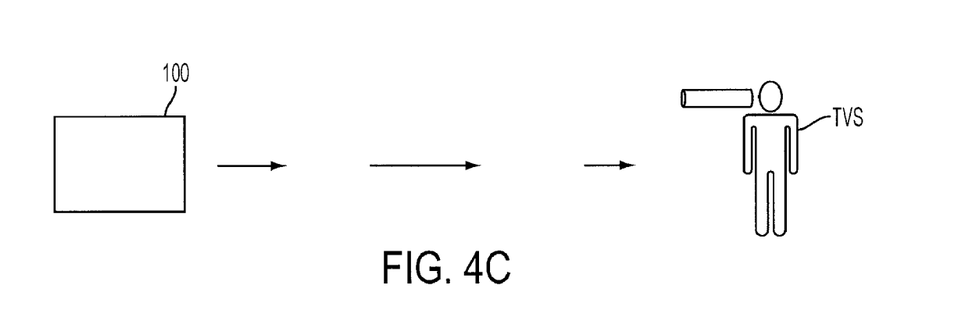
FIG. 4C illustrates using a combination of FIGS. 4A and 4B.

FIGS. 4A–C illustrate one embodiment of the invention wherein a time-based encryption algorithm is utilized in the system 100 to prevent next-generation TVS from unauthorized decryption through use of heuristic technology. In a specific embodiment of the invention, a first infrared light pulse of a first time period is created; the first infrared pulse is then diffused through a first Fourier transform at a target to block viewing of the target with the thermal vision system. A second infrared light pulse of a second time period is then generated. The second infrared light pulse is then diffused through a Fourier transform at the target to block viewing of the target with the thermal vision system. A third infrared pulse of a third time period is then generated. The third infrared pulse of the third time period is then diffused through a Fourier transform at the target. It should be understood that the first time period is shorter in length than the second time period. The second time period is shorter in length than the third time period. And, the third time period is longer in length than the first and second time periods. The first, second and third time periods are all different.

FIG. 4A illustrates one embodiment of the invention, wherein the laser pulse is controlled so that each pulse or series of pulses is variable. FIG. 4B shows the process of controlling the time in between the laser pulses or the pulse rate so that a thermal vision system cannot anticipate or filter the interference. FIG. 4C shows the process of using a combination of the pulse rate and pulse length to prevent "encrypting" of the interference patterns.

Figure 5A:
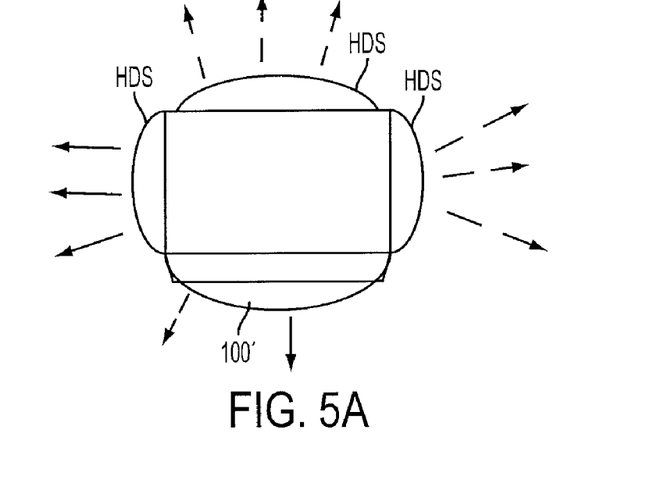
FIG. 5A shows a multiple degree embodiment of the invention.
Figure 5B:
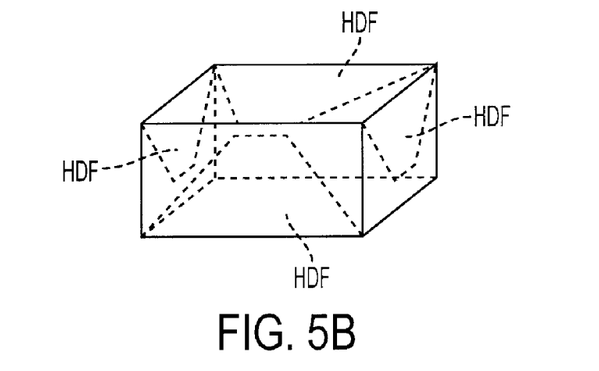
FIG. 5B illustrates the multiple degree embodiment from another view.
Figure 5C:
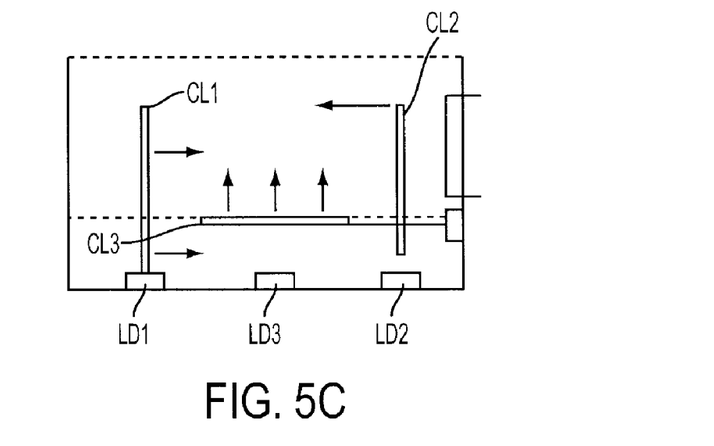
FIG. 5C illustrates a sample interior configuration a multiple degree embodiment.

FIGS. 5A–5C illustrate alternate embodiments of the system 100' in which thermal vision is disrupted in multiple degrees (or all six degrees if desired). FIGS. 5A and 5B show an alternate embodiment with 360 degrees of interference capability in the xy plane with 4 sides of holographic diffusion file HDF, which may include the top as well (covering 120–180 degrees in the positive z direction)

depending on the positioning. FIG. 5C illustrates how multiple laser diodes (LD1, LD2, LD3) and collection lenses (CL1, CL2, CL3) may be positioned. The variations on placement of internal components for the alternate embodiment will depend on the manufacturing and assembly requirements as well as the intended end use (e. g. portable, stationary, vehicle mounted, etc.).

Figure 6:
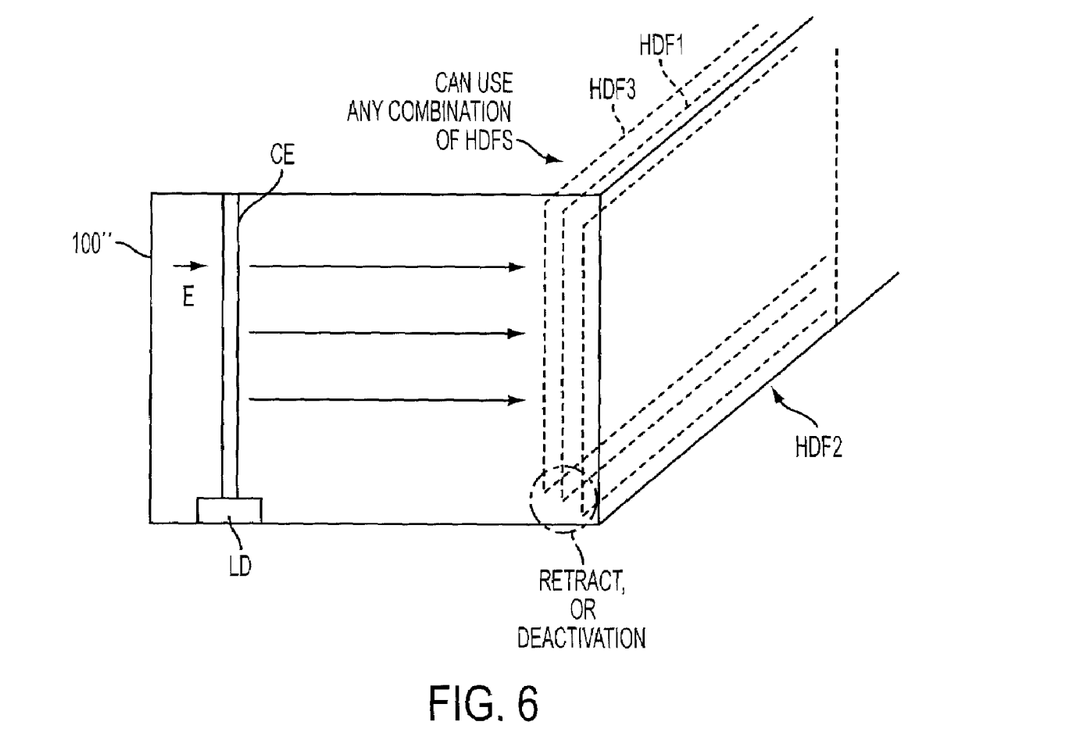
FIG. 6 shows multiple holographic diffusion embodiments.

In another alternative embodiment of the invention, system 100 comprises at least one liquid crystal display ("LCD") chip, or chips with multiple functional capabilities for generating high-performance, electronically controllable holographic diffusion. This feature involves dynamically changing the light direction and diffusion characteristics to prevent next generation thermal vision systems from countering this technology based on location and thermal pattern recognition techniques, which is shown in FIG. 6.

Figure 7:
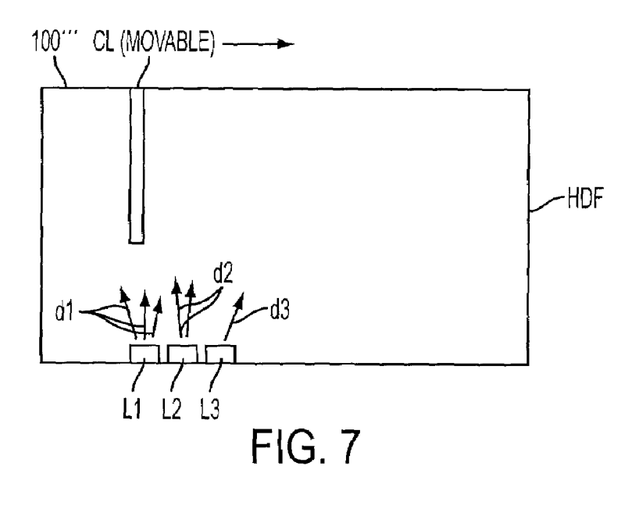
FIG. 7 shows multiple uses of laser frequencies through tunable lasers or multiple diodes.

In further alternative embodiments, system 100 comprises laser diodes of different types to prevent the thermal vision systems from countering the technology. The laser diodes are alternately implemented to prevent effectively filtering a single type of radiation (infrared) interference, as shown in FIG. 7.

In view of the above, it will be seen that all the objects and features of the present invention are achieved, and other advantageous results obtained. The description of the invention contained herein is illustrated only, and is not intended in a limiting sense.

What is claimed is:

1. A method for interference with the electronic processing capability of vision systems comprising: generating radiation from at least one diode; collecting said radiation from said at least one diode in at least one lens; directing said radiation to a diffusion system, said diffusion system being adapted to perform a non-linear operation on said radiation; diffusing the radiation into viewing target areas to create at least one radiation field that covers the viewing target for said vision system, thereby interfering with the electronic capability of vision systems, wherein said diode emits a pulsed radiation in an encoded and encrypted manner.

2. The method of claim 1 wherein creating a radiation field that covers a viewing target for said vision system comprises configuring the diffusion system such that a radiation field that covers a viewing target for said vision system is created.

3. The method as recited in claim 1, wherein said vision system is a thermal vision system.

4. The method as recited in claim 1, wherein said diode emits radiation between 700 and 1000 nanometers.

5. The method as recited in claim 1, wherein said diode emits pulsed radiation at a controlled time.

6. The method as recited in claim 1, wherein said diode emits pulsed radiation at a controlled pulse rate.

7. The method as recited in claim 1, wherein said diode emits pulsed radiation at a controlled time and a controlled pulse rate.

8. The method as recited in claim 1, wherein directing the radiation to a diffusion system comprises directing the radiation to a mirror, the mirror directing the radiation to the diffusion system.

9. The method as recited in claim 1, wherein diffusing the radiation into viewing target areas to create a radiation field comprises performing a non-linear operation on said radiation.

10. The method as recited in claim 9, wherein said non-linear operation is a Fourier transform.

11. The method as recited in claim 1, wherein said lens directs said radiation to a diffusion system.

12. The method as recited in claim 1, wherein diffusing the radiation comprises diffusing the radiation comprises using at least one liquid crystal display chip to generate holographic diffusion.

13. The method as recited in claim 1, wherein diffusing the radiation comprises using at least one liquid crystal display chip with multiple functional capabilities for generating holographic diffusion.

14. The method as recited in claim 1, wherein the vision system is disrupted in multiple degrees.

15. The method as recited in claim 1, wherein generating radiation from at least one diode comprises generating radiation from multiple diodes.

16. The method as recited in claim 1, wherein collecting said radiation from said at least one diode in at least one lens comprises collecting said radiation from said at least one diode in multiple lenses.

17. The method as recited in claim 1, wherein multiple radiation is generated from multiple diodes and radiation is collected in multiple lenses.

18. The method as recited in claim 1, wherein generating radiation from a diode comprises alternatively generating radiation from diodes of different types.

19. The method as recited in claim 1 wherein said diffused radiation field is emitted in multiple directions.

20. The method as recited in claim 1, wherein said diffused radiation field is emitted in four directions.

21. A method for interfering with the electronic processing capability of a vision system, comprising: creating a first infrared light pulse of a first time period; diffusing said first infrared pulse through a first Fourier transform at a target to block viewing of said target with said thermal vision system; creating a second infrared light pulse of a second time period, the second time period being a time period that is longer than the first time period; diffusing said second infrared light pulse through a Fourier transform at said target; generating a third infrared pulse of a third time period, the third time period being a time period that is longer than the first time period and longer than the second time period; and diffusing said second infrared light pulse through a Fourier transform at said target to interfere with the electronic processing capability of the vision system.

22. The method as recited in claim 21, wherein said first and second time periods are randomly calculated.

23. The method as recited in claim 21, wherein said first and second infrared pulses are of different wavelengths.

24. A method for interfering with the electronic processing capability of a vision system, comprising: creating a first infrared light pulse of a first time period; diffusing said first infrared pulse through a first Fourier transform at a target to block viewing of said target with said thermal vision system; creating a second infrared light pulse of a second time period, the second time period being a time period that is longer or shorter than the first time period; diffusing said second infrared light pulse through a Fourier transform at said target; generating a third infrared pulse of a third time period, the third time period being a time period that is longer or shorter than the first time period and longer or shorter than the second time period; and diffusing said second infrared light pulse through a Fourier transform at said target to interfere with the electronic processing capability of the vision system.

25. The method as recited in claim 24, wherein said first and second time periods are randomly calculated.

26. The method as recited in claim 24, wherein said first and second infrared pulses are of different wavelengths.

* * * * *